July 18, 1939.                M. WILFART                2,166,833
                        SYNCHRONIZING APPARATUS
                          Filed Feb. 26, 1937                5 Sheets-Sheet 1

Inventor:
Maurice Wilfart,
by Harry E. Dunham
    His Attorney.

July 18, 1939.    M. WILFART    2,166,833
SYNCHRONIZING APPARATUS
Filed Feb. 26, 1937    5 Sheets-Sheet 2

Inventor:
Maurice Wilfart,
by Harry E. Dunham
His Attorney.

July 18, 1939.    M. WILFART    2,166,833
SYNCHRONIZING APPARATUS
Filed Feb. 26, 1937    5 Sheets-Sheet 4

Inventor:
Maurice Wilfart,
by Harry E. Dunham
His Attorney.

July 18, 1939.  M. WILFART  2,166,833

SYNCHRONIZING APPARATUS

Filed Feb. 26, 1937  5 Sheets-Sheet 5

Inventor:
Maurice Wilfart,
by Harry E. Dunham
His Attorney.

Patented July 18, 1939

2,166,833

UNITED STATES PATENT OFFICE 2,166,833

SYNCHRONIZING APPARATUS

Maurice Wilfart, Paris, France, assignor to General Electric Company, a corporation of New York Application February 26, 1937, Serial No. 128,033
In France March 11, 1936

16 Claims. (Cl. 172—245)

My invention relates to improvements in synchronizing apparatus and has for its principal object the provision of improved synchronizing apparatus for controlling the operation of connecting two alternating current circuits whereby to effect the connection only when the electromotive forces of the circuits are substantially in phase and have substantially the same frequency. This and other objects of my invention will appear in more detail hereinafter.

It is known that the closing of tie switches for alternating current networks is subjected to various conditions, the principal of which are as follows:

The voltages of the two networks must be nearly equal. Known methods, for example, the use of voltmetric relays, make it possible to prevent the closing of the tie switch if this condition is not present.

Moreover, the voltages of the two networks must have nearly the same frequency and must be substantially in phase. If the alternating voltage of each one of the networks is represented by a revolving vector, the closing of the tie switch must take place only when these two vectors coincide in one and the same angular position, or at least when the angle between the two vectors is below a given value, which is always very low.

Only in rare instances can the coincidence of the vectors be observed for a certain time. In general, the closing of the tie switch must be accomplished when the angle between the two vectors decreases and attains a low value. Inasmuch as this closing requires a rather extensive period of time, which fortunately is nearly constant, the closing operation must be started only when the angle between the two vectors has a certain value, which will decrease during the operation. If the closing operation starts at the correct moment, the movable contacts of the interrupter will touch the fixed contacts thereof when the two vectors representing the voltages are close to each other.

In view of the foregoing, the closing order must therefore be given, only when the voltages are in phase, and, if the two frequencies are substantially alike and remain so. If the frequencies are unequal, the order must be given when the angle between the two vectors is decreasing and reaches a certain value, which, in the following, will be called angle of advance and will be represented by the letter A. Inasmuch as the operating time for the interrupter is nearly constant, the angle of advance must be a function of the frequency difference. Moreover, it would be dangerous to perform the interconnection when the frequency difference is too high. These conditions make it necessary to assign to the angle of advance a maximum value and to have protective devices which must prevent the interconnection, if the frequency difference is too high.

Several automatic control devices for the tie switches of alternating current networks are known. These devices are generally very expensive, complicated, and subjected to maladjustments. Nevertheless, they do not take account of all the conditions of an absolutely correct interconnection, and they still entail certain risks of incorrect interconnection, especially for quick interconnection.

In accordance with my invention, I provide improved methods and devices which do away with these short-comings and which make it possible to build a simple apparatus which gives full safety at acceptable cost. This equipment may comprise several degrees of accuracy, including that which takes rigorous account of all the conditions of correct interconnection.

The main characteristics of my invention are as follows: A synchroscope, or any equivalent apparatus, indicates through its angular position the value of the angle between the vectors which represent the voltages of the networks to be coupled. As a result, the movable element of that apparatus rotates at a speed which corresponds to the difference between the frequencies of these networks. If the coupling is to be accomplished according to the simplest law, the closing operation of the tie switch must start when the leading angle of the movable member of the synchroscope decreases and attains a value proportional to the frequency difference at the moment. This frequency difference may be measured by any kind of tachometric system, if the synchroscope is sufficiently powerful for driving such a system, otherwise a photoelectric cell arrangement modulates a current whose frequency varies with the frequency difference or slip. In order to discern the direction of rotation of the slip, a fixed frequency is added to the frequency which measures the slip. The modulated current, which is thus produced, energizes a frequency meter, or any device having equivalent functions. The control arrangement compares the position of the synchroscope and that of the movable member of the frequency meter or tachometer and controls the closing mechanism of the interrupter, when the relative positions of these two devices show that the angle of advance is suitably proportional to the slip. This control may be obtained by the contact of two conducting members or by a photoelectric arrangement which requires the coincidence of two slits or of three slits.

If it is desired to ensure a more accurate interconnection, then, in accordance with my invention, I take into account not only the phase angle and the slip, but also the rate of change of slip. For this purpose, I may measure such rate of change by mounting on the shaft of the synchroscope or on the shaft of an inserted synchronous motor, a flywheel mounted on a flexible arm. Alternatively, I may utilize two synchroscopes, only one of which carries a flywheel. In these last two cases, the slip may be measured by way of the braking produced by a magnetic flux. The control of the tie-switch closing is instituted at the coincidence of the three elements. This coincidence may be electrically shown by contacts, or optically by the superposition of three slits. The first element, which is directly coacting with the synchroscope, indicates at any instant the phase angle, the second element, which is braked by the inertia and by the magnetic flux, indicates the sum of the slip and its rate of change, and the third element is a shield or screen fixed in space. In all the variants, a relay device, for example, a frequency-meter-type relay, prevents the closing of the interrupter as long as the frequency difference differs from a predetermined value.

With arrangements embodying my invention it is possible to control automatically the beginning of the closing operation of a tie switch, when the conditions regarding the phase angle, the slip, and also the slip acceleration are suitable. These arrangements may also be utilized, in accordance with my invention, to bring about some interlocking effects which prevent any incorrect coupling. These devices may be so adjusted and connected that they effect, at the right time, the actuation of the trip-free mechanism of the tie switch, should, during the closing operation, the latter being accomplished by another device, in accordance with my invention, or otherwise automatically or by hand, the coupling conditions have become incorrect.

My invention will be better understood when considered in connection with the accompanying five sheets of drawings, and its scope will be pointed out in the appended claims.

In the accompanying drawings.

The several figures are limited to the members that are necessary to the understanding of the invention. In general, the conventional members of apparatus used in the coupling of alternating current systems have not been shown, for instance the voltmetric relays which prevent the closing of the tie switch if the voltages in the networks to be coupled are not equal. Figs. 1 to 12 represent different variants of a simple equipment which does not take account of the rate of change of slip of the two networks to be coupled. In order to control at the desired moment the closing of the tie switch, it is necessary to measure constantly the angle between the two vectors that represent the voltages of the two networks and the frequency difference of these networks. For simplicity, this difference will be denoted later on by the letter G (apparent slip).

To measure the angle between the two vectors, it is particularly convenient to utilize the apparatus known as the synchroscope. It is known that this apparatus, which is energized by the two alternating current systems to be connected, furnishes, through the rotation of its movable element, two interesting indications: Its speed of rotation corresponds to the difference between the frequencies, and its angular position, for instance with respect to the vertical, indicates the angle between the two voltage vectors. In the case of manual control, it is necessary to start the closing of the interrupter when the pointer rotates slowly, approaches the vertical, and maintains with regard thereto an angle of advance proportional to the speed of rotation of the movable element.

For the conventional synchroscope, any other suitable apparatus can obviously be substituted, for example, the combination of two synchronous motors and a differential system which is capable of indicating through its displacement the value of the phase angle between the voltages of the networks and the frequency difference.

To measure the difference between the two frequencies, the first procedure in accordance with my invention, comprises the emission of electrical impulses whose number per second is proportional to the difference between the frequencies. In practice, it is advisable, in view of the conventional measuring apparatus, and this is an improvement which is a part of my invention, to select a relatively high multiple of the frequency difference. Figs. 1 to 6 show several arrangements which embody my invention and which are now described as illustrative examples thereof.

Figure 1:
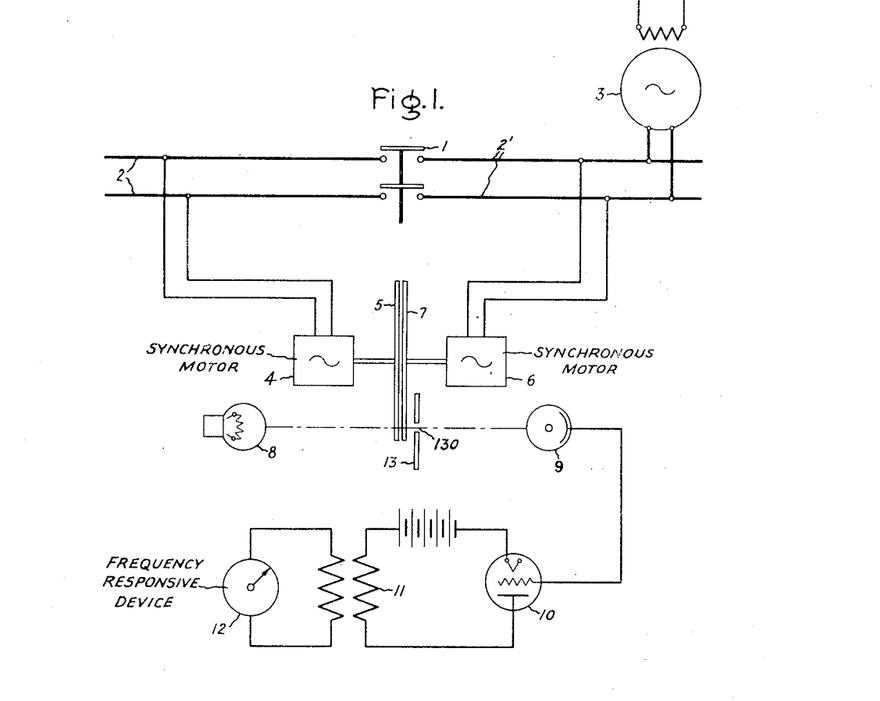
Fig. 1 illustrates synchronizing apparatus embodying my invention and effective to provide a frequency which is a multiple of the frequency difference between the electromotive forces of the circuits to be connected.

In Fig. 1, 1 represents a tie switch, such as a circuit breaker, which can be operated to interconnect an alternating current network 2 with a network 2' fed by an alternator 3. The network 2 energizes a small synchronous motor 4 which drives a light modulating disk 5 provided with suitable openings adjacent its periphery. The alternator 3 energizes a small synchronous motor 6 which drives a light modulating disk 7 provided with suitable openings adjacent its periphery. A suitable light source indicated as an electric lamp 8 projects its light beam towards a photoelectric cell 9 whenever openings in the two disks coincide. The current, which is permitted to flow by the cell and which is amplified by an electric discharge valve 10, traverses the primary winding of transformer 11. The secondary winding of this transformer energizes a measuring apparatus 12, which may be an electromagnetic frequency meter, or a frequency meter of the vibrating-reed type, or a tachometer which uses electric impulses, examples of all of which are well-known to the art.

The openings in the two disks 5 and 7 are arranged as follows: The interval between two openings is always equal to the diameter of one opening. Moreover, the diameter of the openings is the same for both disks.

Figure 2:
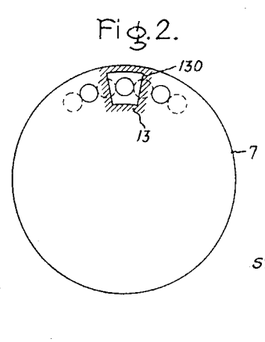
Fig. 2 illustrates in detail a portion of apparatus shown in Fig. 1.

A stationary shield 13 shown in more detail in Fig. 2 limits the light flux to the area of its window 130, whose length exceeds a circumferential pitch. Under these conditions, the light flux received by the cell 9 varies periodically from one zero value to its maximum value. If the disk openings are circular, the curve which represents the values of this light flux, as a function of time, is similar to the positive half-wave of a sinusoid.

The frequency of these impulses can be easily calculated. It corresponds to the algebraic sum of the number of openings which pass per second on one of the disks and the number of openings which pass per second on the other disk, one of the two numbers being taken negatively if, as provided in the physical embodiment which we use as an example, the two disks rotate in the same direction. It will be seen that the frequency of these pulsations is dependent on the frequency difference of the electromotive forces of the two networks.

Figure 3:
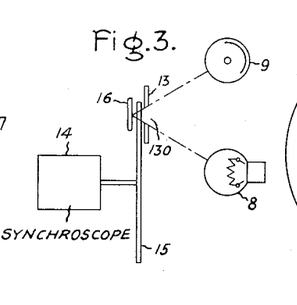
Fig. 3 illustrates another embodiment of my invention for obtaining the multiple frequency effect.
Figure 4:
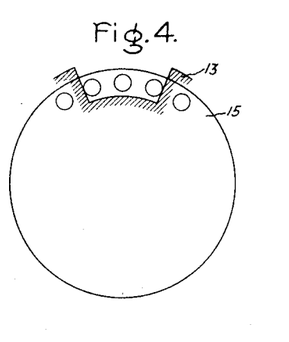
Fig. 4 illustrates in detail a portion of the apparatus shown in Fig. 3.

Fig. 3 shows another means of obtaining these pulsations. A synchroscope 14 is energized by the two networks to be connected and drives a modulating disk 15 shown in more detail in Fig. 4. The openings in this modulating disk pass in front of a stationary screen or shield 13, which has openings of the same diameter and circumferential pitch as those of the modulating disk. The light flux of lamp 8, after passing first through the openings in the disk 15 and the openings in the screen or shield 13, is reflected by a plane mirror 16, and after another passage through the openings, this light beam reaches the photoelectric cell 9. Inasmuch as the movable element of the synchroscope 14 rotates at a speed which corresponds to the frequency difference of the electromotive forces of the two networks, the frequency of the periodic current thus obtained is itself a multiple of that difference.

The two devices which have just been described do not give the sign of the frequency difference. In other words, the modulated frequency which is produced is the same, for a given frequency difference, whether the vector voltage of alternator 3 rotates faster than the vector voltage of network 2, or vice versa. But it is desirable to know the sign of the frequency difference, which in turn determines the sign of the advance angle.

For this purpose, I add, in accordance with my invention, to the variable frequency thus produced a fundamental frequency in any suitable manner, two examples of which follow:

As regards the small modulator set of Fig. 1, the disks are provided with different numbers of holes. By way of example, one disk has nineteen holes, while the other disk has twenty holes. If the synchronous motors are bipolar motors, the frequency of the modulated current for two networks with an average frequency of fifty cycles per second will likewise be fifty cycles per second when the difference in frequency is zero, but it will be higher than fifty cycles per second if the difference is positive, and lower than fifty cycles per second when the difference is negative.

If a synchroscope is used as modulator, such as has been shown in Figs. 3 and 4, Figs. 5 and 6 represent an arrangement which shows how a constant frequency may be added to the multiple frequency of the apparent slip.

Figure 5:
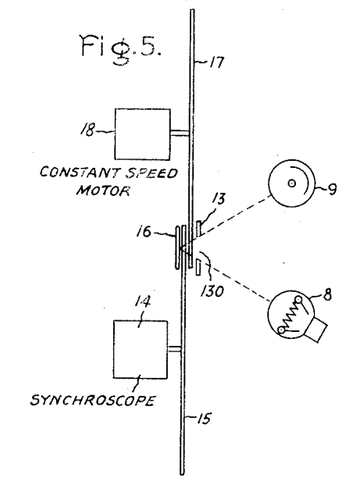
Fig. 5 illustrates apparatus embodying my invention for modulating the multiple frequency effect by a constant frequency.
Figure 6:
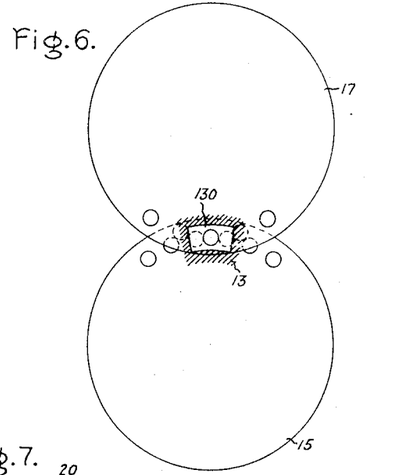
Fig. 6 illustrates in detail a portion of the apparatus shown in Fig. 5.

The light beam of lamp 8, after having been reflected by the mirror 16, reaches the photoelectric cell 9, when the relative position of the holes permits its passage.

The modulation of the photoelectric current to provide a constant base frequency for the frequency responsive device, such as 12 of Fig. 1, when the frequency difference is zero is provided by a disk 17, which is driven at a substantially constant speed by a small motor 18. This may be provided with suitable speed regulating means such as a centrifugal governor, as is well-known to the art, to control its speed so as to maintain constant speed. For a frequency difference in one sense, the frequency of modulation would be above this base frequency, and for a frequency difference in another sense, the difference would be below this base frequency, and the difference between the modulation frequency and the base frequency will be proportional to the frequency difference.

Provided the above-mentioned conditions are observed regarding the disposition and size of the holes, this device will add to the variable frequency corresponding to the rotational speed of the synchroscope a fixed frequency which may be selected, of, for example, fifty cycles.

The current thus modulated is an undulating current which can be easily transformed into alternating current of sinusoidal shape by means of a transformer, the secondary of which may supply an apparatus for measuring the frequency.

Figure 7:
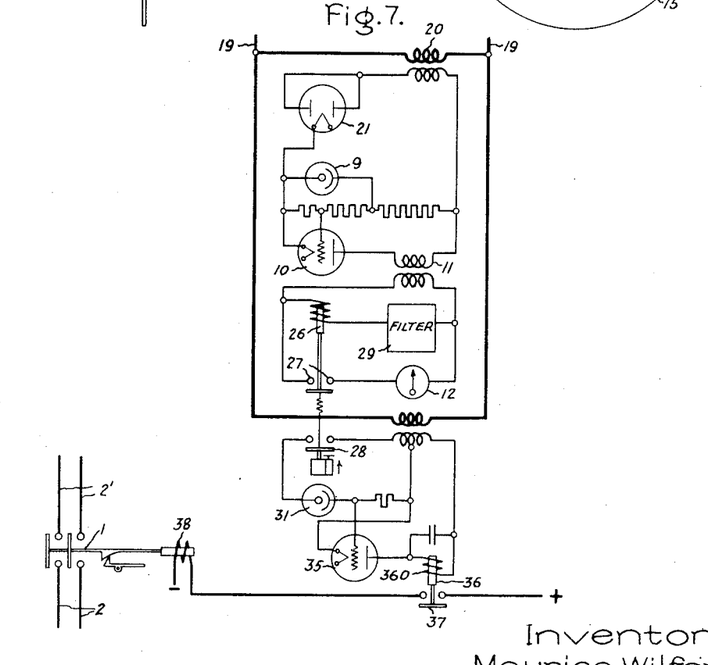
Fig. 7 illustrates a complete synchronizing apparatus embodying my invention.

Fig. 7 gives the simplified diagram of a complete equipment for automatically controlling the closing operation of an interrupter which connects the two networks or circuits 2 and 3. The part of the diagram, which deals with the frequency differences, comprises the following apparatus: An alternating current source or bus 19 (which may be energized from one of the two networks to be connected) supplies a rectifier set comprising a transformer 20 and a rectifier valve 21. The direct current thus produced supplies the photoelectric cell 9 for the modulation, as set forth in connection with the arrangements shown in Figs. 1 to 6, inclusive, whose variable current is amplified by the valve 10 and reaches the primary of the transformer 11. The secondary modulated current supplies the frequency responsive device 12.

In order to prevent incorrect connections, the closing must be prevented when the frequency difference, be it positive or negative, exceeds a given value. To this end, the modulated current is caused to energize the coil of a relay device 26. A filter 29 in the circuit of the coil of this relay is so adjusted that the relay cannot actuate its contacts 27 unless the modulated frequency lies between two mean values, for example, forty-five and fifty-five cycles per second, which values represent the allowable limits as regards the frequency difference between the electromotive forces of the two networks.

The frequency responsive device 12 is thus put in service only when the frequency difference is suitable for the interconnection; moreover, the relay 26 has an additional contact 28 for which a certain time delay has been provided in closing, and which permits placing into service of the interconnection circuit only when the suitable frequency difference has prevailed for a predetermined time. Under these conditions, the frequency responsive device 12 has had time to assume the position which corresponds to the modulated frequency of the moment.

For effecting the closing of the tie switch with the arrangement so far described in Fig. 7, I may use a second photoelectric system of which several modifications are separately illustrated in Figs. 8 to 12.

Figure 8:
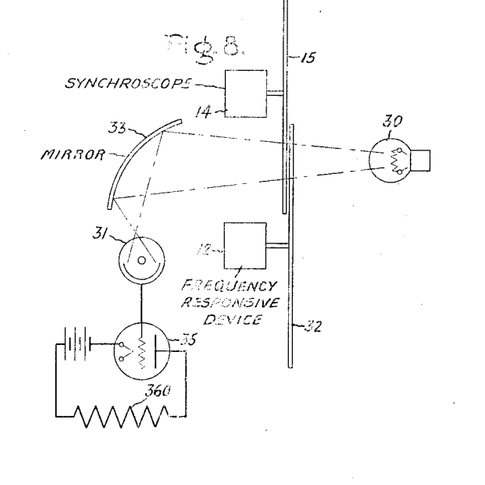
Fig. 8 illustrates an arrangement for controlling a part of the closing operation in connection with apparatus embodying my invention, as shown in Fig. 7.
Figure 9:
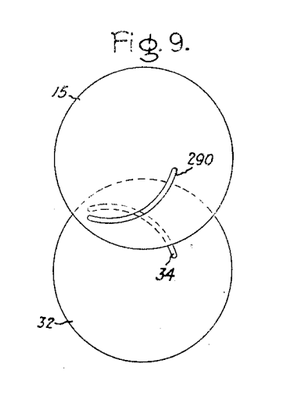
Fig. 9 is a detail of a part of the apparatus shown in Fig. 8.

The Figs. 8 and 9 show an optical arrangement, wherein the disk 15 of the synchroscope 14, which has already been used for the modulation in Fig. 3, is besides provided with a spiral-shaped slit 290. After it has traversed a disk 32 and a disk 15, and after reflection by means of the mirror 33, the light beam of a lamp 30 reaches the controlling photoelectric cell 31. The disk 32 has a slit 34 also spiral shaped, and it is driven by the frequency meter 12. It is evident that the light can only pass when the two spiral-shaped slits 290 and 34 coincide on the reference axis, for instance on the vertical axis.

The slits 290 and 34 are so designed that the photoelectric cell 31 will receive a light impulse when the angle of advance of the synchroscope 14 corresponds to the modulation frequency of the moment, that is to say, to the frequency difference. The electric impulse thus effected is amplified through the valve 35, and then energizes the coil 360 of a relay 36 q. v. Fig. 7 which effects the closing of the tie switch.

In the diagram of Fig. 7, there are shown the essential elements of the circuit which controls the operation, and in addition, the contact 37 of the closing relay 36 which, at the desired moment, energizes the closing mechanism 38 of the coupling interrupter or tie switch.

Figure 10:
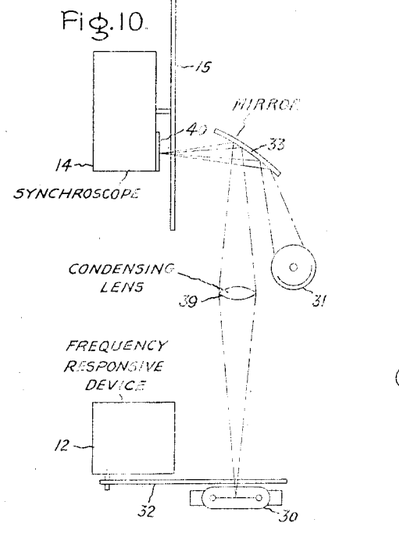
Fig. 10 illustrates a modification of the embodiment of my invention shown in Fig. 8.
Figure 11:
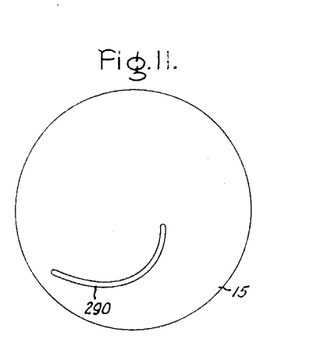
Figs. 11 and 12 illustrate portions of the apparatus shown in Fig. 10.
Figure 12:
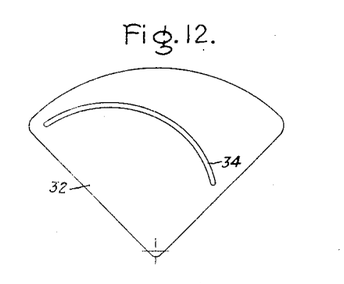

Figs. 10, 11, and 12 illustrate a modification of the arrangement shown in Figs. 8 and 9. The light beam of lamp 30, after passing through the spiral slit 34 in a disk 32, which is actuated by the frequency responsive device 12, is concentrated by an objective such as a condensing lens 39 and then reflected by a mirror 33. At the desired moment, it passes through the slit 290 of disk 15, which is actuated by the synchroscope 14, after which it is reflected by a plane mirror 40 and then again reflected by the mirror 33, whereupon it reaches the photoelectric cell 31.

The arrangements so far described take into consideration the frequency difference, but the connection which they effect is only absolutely correct when the frequencies of the two networks to be interconnected remain fixed, or nearly so, throughout the duration of the closing process of the tie switch. If it is desired further to reduce the risk of inaccurate connections, I may use, in accordance with my invention, an improvement which consists in correcting the angle of advance A so as to take account of the positive or negative acceleration of the slip between the frequencies of the networks to be connected. If A is the angle of advance (positive or negative),
G the frequency difference or the slip (positive or negative), $$\frac{dG}{dt}$$

the slip acceleration (positive or negative),
T the usual duration or time of the closing operation of the interrupter, then the following relation holds:

$$A = T\left(G + \frac{1}{2}\frac{dG}{dt}T\right)$$

and the angle of advance not only should be proportional to the slip of the moment, but also should vary with the slip acceleration. Inasmuch as the usual duration of the closing is known, it is possible to adjust the sensitivity to the acceleration with respect to the sensitivity to the slip.

Figures 13, 14:
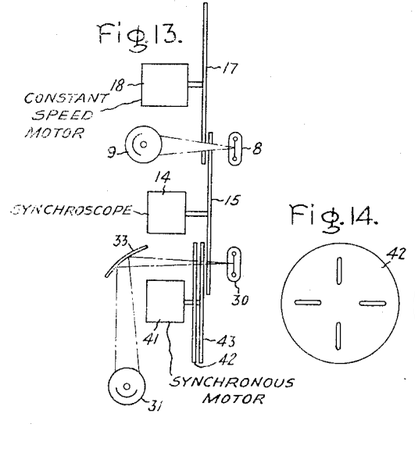
Fig. 13 illustrates an embodiment of my invention for including in the control the rate of change of frequency difference or slip.
Fig. 14, 15, and 16 illustrate details of certain parts of my invention shown in Fig. 13.

Figs. 13-18, inclusive, show, by way of example, one arrangement for obtaining this response to these two determining factors. Instead of the frequency meter, a more complex device is used. As illustrated the device comprises a small synchronous motor 41 which is fed by the modulation frequency. The shaft of the motor 41 carries two disks 42 and 43. The disk 42 is rigidly secured to the motor shaft. It carries a certain number of radial slits, for example, four slits, as shown in Fig. 14, although practically it may have more slits. Thus there may be ten radial slits.

Figure 15:
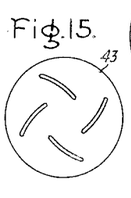
Figure 16:
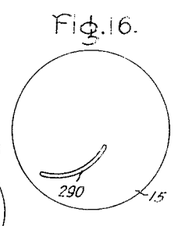
Figures 17, 18:
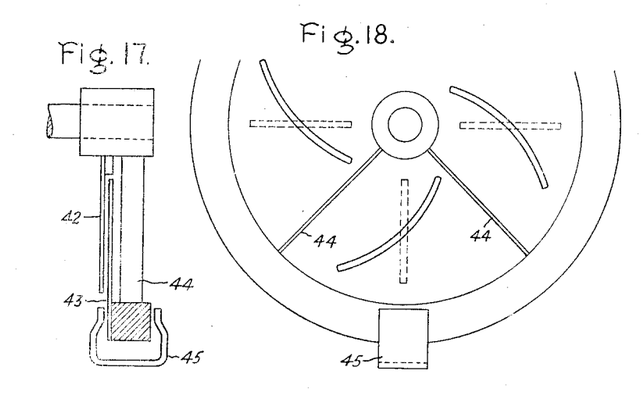
Figs. 17 and 18 represent in detail part end and side elevations of a portion of the apparatus shown in Fig. 13.

The disk 43, shown in elevation in Fig. 15, has the name number of slits as the disk 42, but these slits are spiral shaped. It is secured to the shaft of the motor 41 so as to rotate with the shaft and yet be rotatable relatively thereto. For this purpose, it may be mounted on a plurality of several flexible arms 44 comprising leaf or flat springs secured to the shaft. Its moment of inertia is so increased by suitable rim enlarging, for example, that it constitutes a small flywheel, as shown by the radial cross-section of Fig. 17 on a larger scale, while a plan view of the disks is shown in Fig. 18. This arrangement provides an easy method for measuring the positive or negative angular acceleration of a shaft. Thus, there is produced between the shaft and the flywheel, an angular displacement which is proportional to the acceleration. Moreover, the rotation of disk 43 may be braked or damped, regardless of its direction, by the flux of a permanent magnet 45. By making the disk of metal, the parasitic currents that are produced will oppose the motor torque by a resisting torque practically proportional to the speed.

If the flywheel effect is combined with the braking effect of the magnet, it will be clear that when the frequency difference is not constant, an angular displacement is produced between the shaft of the synchronous motor 41 and the flywheel, that is to say, between the disk 42 and the disk 43. This angular displacement is proportional to the albebraic sum of two quantities; viz., the frequency difference or slip and the acceleration or rate of change of the frequency difference. The respective sensitivities in regards to these two magnitudes can be proportioned by modifying the moment of inertia of the flywheel, or the elasticity of the arms, or the distance which separates the magnet from the disk, etc.

The spiral slits of the disk 43 are so designed as to change the angle of advance in dependence on the rate of change of slip. Thus, the light beam from lamp 30 can traverse the disks 42 and 43 only when the angle of advance is suitably corrected for the rate of change of slip. In this manner, the number of light impulses permitted to pass depends on the number of slits per disk and on the speed of the disks. This intermittent beam is located at a distance from the center which varies with the phase angle between the two disks and is consequently proportional to the sum of the slip and the slip acceleration.

Before it reaches the controlling photoelectric cell 31, this light beam must traverse the disk 15 which is actuated by the synchroscope 14. This can occur only when the spiral slit 290 coincides with the beam, which is determined by the angular displacement of the disks 42 and 43. In other words, there must exist a coincidence in the slits of the disks 15, 42, and 43. It will be noted that the first disk rotates slowly, while the other two disks rotate rapidly at the same speed. This coincidence occurs several times per second but only when the following condition is satisfied:

$$A = T\left(G + \frac{1}{2}\frac{dG}{dt}T\right)$$

Figures 19, 24, 25, 26:
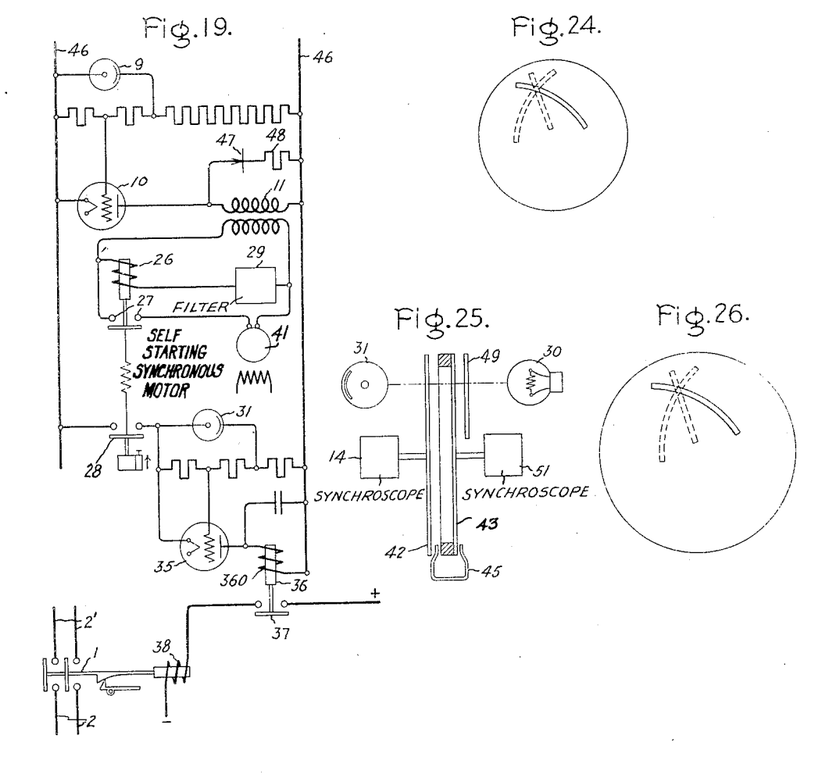
Fig. 19 illustrates the connections of apparatus embodying my invention, including the rate of change of frequency difference control.
Fig. 24 is an explanatory diagram for use in connection with Figs. 20–23, inclusive.
Fig. 25 illustrates another modification of my invention for obtaining the rate of change of frequency difference response.
Fig. 26 is a diagram explanatory of the apparatus illustrated in Fig. 25.

Fig. 19 shows the simplified electric scheme of connections of synchronizing apparatus embodying the features just described. The control source of energization is assumed to be direct current buses 46. The modulation circuits comprise mainly the photoelectric cell 9, its amplifying valve 10, and a transformer 11, generally as shown in Fig. 7. The modulated current, which is so produced, energizes instead of a frequency responsive device, the small self-starting synchronous motor 41. The speed of this motor must faithfully follow the variation in the slip: If the latter decreases, the valve 10 will prevent any return of power to the buses. Consequently, I provide means for braking the synchronous motor which will come into action only in the case of slip retardation. As shown, this means comprises a rheostatic braking circuit, which includes an apparatus of unidirectional conductivity such as a dry rectifier 47 and a resistance 48.

Also as in Fig. 7, the circuit of the coil of the relay is provided with a filter 29. When the modulated frequency is between two given values, for example, between 45 and 55 cycles per second, the instantaneous contact 27 energizes the synchronous motor 41. The retarded contact 28 permits the actuation of the control circuits of the tie switch only if the modulated frequency has been suitable for one or two seconds, a feature which enables the synchronous motor 41 to assume its speed of equilibrium.

The control is accomplished by means of photo-electric cell 31 and the valve 35, which energizes the coil 360 of the control relay 36. This circuit must be so designed that the relay will operate for the high frequency light impulses which are received by the photoelectric cell 31. Their duration represents only a slight fraction of the total time. The contact 37 of the relay 36 controls the closing mechanism 38 of the tie switch.

It will be noted that this arrangement will likewise call for outside energy for the supplying of the synchronous motor. No torque opposes the driving torque of the synchroscope, which retains its precision.

The different modifications, which have so far been described for measuring the frequency difference utilize the emission of electrical impulses by means of the combination of one or more modulator disks with a photo-electric cell. The energy which actuates the measuring apparatus is derived from an auxiliary network. No resisting torque is opposed to the movement of the synchroscope, which retains its precision and requires only a slight amount of current.

When the power sources, especially the potential transformers, permit supplying a synchroscope having a large torque, such apparatus can work against a considerable opposing torque without noticeably decreasing its precision. It is then possible to eliminate the optical as well as the photoelectrical part of the above-mentioned embodiments and to drive directly through the synchroscope a mechanical or an electrical tachometer, whose measuring shaft will permit the same functions, that shall be described in the following, as the shaft of the frequency meter that has been described so far. One of the modifications to be described in connection with Figs. 20–24, inclusive, represents an application of a measurement of the frequency difference without any electrical system interposed.

The shaft of the synchroscope 14 has two disks. Disk 42 is provided with a radial slit which is suitably oriented and disk 43 is provided with a heavy rim which acts as a flywheel and which is subject to the braking effect of the permanent magnet 45. This disk 43 is provided with a spiral slit. As previously explained, the coincidence of the slits occurs always on the radial slit of disk 42, at a radius which varies according to the sum of the slip and slip acceleration.

Figures 20, 21:
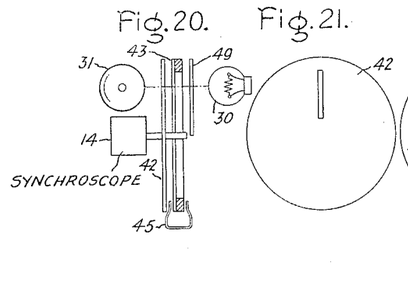
Fig. 20 illustrates another embodiment of my invention for obtaining response to the rate of change of frequency difference.
Figs. 21, 22 and 23 represent details of portions of the apparatus shown in Fig. 20.
Figure 22:
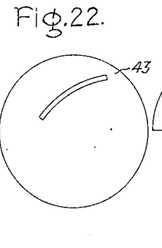
Figure 23:
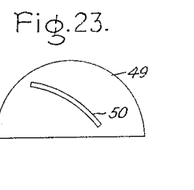

A fixed screen 49 comprises a slit 50, whose axis follows approximately a spiral. The light beam from lamp 30 can only reach the photocell 31 and thus effect the closing of the circuit breaker when the three slits coincide; that is, the slits of disk 42, of disk 43, and of the shutter 49. The slit shapes are so designed that the correct automatic closing of the interrupter is ensured and will follow the law:

$$A = T\left(G + \frac{1}{2}\frac{dG}{dt}T\right)$$

This arrangement ensures sufficient accuracy if the resisting torque produced by the magnet 45 and the moment of inertia of disk 43 are slight with respect to the driving torque of the synchroscope.

If the power sources do not permit the feeding of a sufficient powerful synchroscope, the embodiment of my invention shown in Figs. 25 and 26 can be used. This embodiment comprises two synchroscopes, each having a slight torque. The first synchroscope 14 comprises a disk 42 with one single radial slit and the second synchroscope 51 drives a disk 43, which acts as a flywheel and which is braked by a permanent magnet 45. This disk is provided with a spiral slit.

The disk 42 of the synchroscope 14, which has no inertia and which is not braked, follows faithfully the variations of the angle between the two voltage vectors. The second synchroscope 51 has constantly, with respect to the first synchroscope, an angular displacement which is proportional to the sum of the slip and of the slip acceleration. It suffices to this end that the motor torque of the synchroscope 51 be proportional, or nearly so, to the angle between the magnetic axis of its stator and the magnetic axis of its rotor. The functioning of this control device is the same as that of the apparatus shown in Figs. 20–24, inclusive. However, in this case the synchroscope 14 is not subjected to any opposing torque and can thus retain its precision unimpaired.

Regardless of what modification is adopted, care must be taken that the positive reliability of the system be ensured. Known means may be utilized to prevent the closing, if any of the apparatus is not in service, such as a phase meter, frequency meter, modulation motor, lamp for the illumination, photocell, amplifier, etc.

The various arrangements which have been described, permit controlling automatically the beginning of the closing operation of a tie switch; the closing, properly speaking, will then proceed satisfactorily in the great majority of cases.

However, very exceptionally, the closing may be accomplished when the angle between the two voltage vectors has retained too high a value; for then, the elements that have been measured, prior to the beginning of the closing, may become modified during the closing operation. If one measures not only the phase angle and the slip, but also the slip acceleration, the probabilities of incorrect coupling are reduced, but they are not entirely eliminated.

All these unfavorable possibilities can be eliminated by applying, in conformity with the invention, the following improvement: The operating mechanism of an interrupter may be characterized, in our present case of tie switch, by two durations: first, the duration of the closing operation, which duration it is best to reduce as much as possible, but which ranges generally, nevertheless, between one-half a second and a second, and second, the lagging obedience to the free-tripping system. In general, the closing operation that has just begun can be prevented by actuating the trip-free release one to three-tenths of a second before the moment when the movable contacts of the interrupter engage the fixed contacts.

Any possibility of incorrect coupling may be eliminated by seeing to it that, during the closing operation, by means of one of the above-described devices embodying my invention for effecting such operation which acts now as a safety interlocking mechanism, and the elements of a correct coupling, such as phase angle, slip, and possibly the slip acceleration, will not be dangerously modified. The total duration of the closing operation consists thus of two periods:

The first begins when a certain device which may or may not be in accordance with my invention, gives the closing order, for then the movable element is set in motion. A second device, in conformity with the invention, continues the control of the coupling elements.

This first period terminates when an electric contact, which coacts with the movable element of the interrupter, signals that the latter has attained a given position, after which the mechanism for the free release will no longer be able to prevent the closing of the circuit.

At that moment, a second device, embodying my invention, comes into action. If the phase-angle conditions and those of the slip, and possibly of the slip acceleration, are suitable, the trip-free mechanism is not actuated, and the second period begins. The interrupter continues in its movement and terminates its closing.

If, on the contrary, these conditions have become incorrect, the free tripping is electrically started; the closing mechanism continues to operate, but the movable element, which has been now released, regains the opening position without having closed the circuit.

As has been described, it is possible to utilize for the control of the trip-free mechanism, a second device similar to those already described for bringing about, in conformity with the invention, the beginning of the closing operation. However, since the duration of the second period is generally less than three-tenths of a second, it can readily be seen that it will suffice to measure the phase angle at that moment. This single measure permits estimating whether it is necessary to bring into play the trip-free system, and the interlocking system is then simplified. It may be limited to one electric contact actuating a sector or to an additional photoelectric contact.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, two alternating-current circuits, means connected to be energized from said circuits for producing an effect dependent on the difference between the frequencies of the electromotive forces of the circuits, means controlled by said producing means for effecting the flow of a periodic current, the frequency of which is a multiple of the frequency difference of the electromotive forces of said circuits, and frequency responsive means connected to be energized by said periodic current.

2. In combination, two alternating-current circuits, means connected to be energized from said circuits for producing an effect dependent on the difference between the frequencies of the electromotive forces of said circuits, means controlled by said producing means for effecting the flow of a modulated current, the frequency of the impulses of which is dependent on the frequency difference of the electromotive forces of said circuits, and means connected to be energized by said modulated current.

3. In combination, two alternating-current circuits, means connected to be energized from said circuits for producing light impulses at a frequency dependent on the difference between the frequencies of the electromotive forces of said circuits, means controlled by said light impulses for effecting the flow of a modulated current, the frequency of the impulses of which is dependent on the frequency of said light impulses, and frequency responsive means connected to be energized by said modulated current.

4. In combination, two alternating-current circuits, means connected to be energized from said circuits for producing an effect dependent on the difference between the frequencies of the electromotive forces of the circuits, means for modifying said effect in accordance with the sign of said frequency difference, means controlled by said modified effect for causing the flow of a modulated current, the frequency of the impulses of which differs from a multiple of the frequency difference of the electromotive forces of said circuits by a fixed amount, and means connected to be energized by said modulated current.

5. In combination, two alternating-current circuits, means connected to be energized from said circuits for producing an effect dependent on the sum of the difference between the frequencies of the electromotive forces of the circuits and the rate of change of said frequency difference, means controlled by said producing means for effecting the flow of a modulated current, the frequency of the impulses of which is dependent on the sum of said frequency difference and the rate of change thereof, and frequency responsive means connected to be energized by said modulated current.

6. Synchronizing apparatus for obtaining an effect dependent on the sum of the frequency difference of two alternating electromotive forces and the rate of change of said frequency difference comprising two movable members, means for driving said members at a speed dependent on the frequency difference of the electromotive forces, one of said members being so mounted that its speed follows sudden changes in the frequency difference and the other of said members being so mounted that its speed either increases or decreases relatively to the speed of said one member upon any sudden change in frequency difference.

7. Synchronizing apparatus for obtaining an effect dependent on the sum of the frequency difference of two alternating electromotive forces and the rate of change of said frequency difference comprising two movable members, means for driving said members at a speed dependent on the frequency difference of the electromotive forces, one of said members being so mounted that its speed follows sudden changes in the frequency difference and the other of said members being so mounted that its speed either increases or decreases relatively to the speed of said one member upon any sudden change in frequency difference, and means controlled by said members in accordance with the simultaneous positioning thereof for controlling the flow of a current.

8. Synchronizing apparatus for obtaining an effect dependent upon the sum of the frequency difference of two alternating electromotive forces and the rate of change of said frequency difference comprising rotatable means, means for actuating said rotatable means at a speed dependent on the difference between the frequencies of the electromotive forces, a member driven by said rotatable means and so associated therewith as to rotate at the same speed, a high inertia member driven by said rotatable means and resiliently mounted relatively thereto whereby to move relatively to said rotatable means upon sudden changes in the speed thereof, and means controlled jointly by said members.

9. Synchronizing apparatus comprising a rotatable member, means for actuating said rotatable member at a speed dependent on the difference between the frequencies of two electromotive forces, a slotted disk driven by said rotatable means at the speed thereof, a second slotted disk resiliently mounted on said rotatable means and movable relatively thereto upon sudden changes in the speed of the rotatable means, a stationary slotted disk, and means adapted to be controlled when the slots in said three disks have a common intersection.

10. Synchronizing apparatus comprising a rotatable member, means for actuating said rotatable member at a speed dependent on the difference between the frequencies of two electromotive forces, a slotted disk driven by said rotatable means at the speed thereof, a second slotted disk resiliently mounted on said rotatable means and movable relatively thereto upon sudden changes in the speed of the rotatable means, a stationary slotted disk, and a source of light and a photoelectric cell so arranged relatively to said disks that when the slots in the disks have a common intersection the photoelectric cell is actuated by said light source.

11. Synchronizing apparatus comprising a rotatable member, means for actuating said rotatable member at a speed dependent on the difference between the frequencies of two electromotive forces, a disk provided with a radial slot and driven by said rotatable means at the speed thereof, a second disk resiliently mounted on said rotatable means and movable relatively thereto upon sudden changes in the speed of the rotatable means, said disk having a curved slot, a stationary disk provided with a curved slot, said three disks being arranged in parallel planes, and means on one side of one outside disk and the opposite side of the other outside disk jointly operative when the slots in the three disks have a common intersection.

12. In combination, two alternating-current circuits, means connected to be energized from said circuits for producing an effect dependent on the sum of the difference between the frequencies of the electromotive forces of said circuits and the rate of change of said frequency difference, means controlled by said producing means for effecting the flow of a modulated current, the frequency of the impulses of which is dependent on the sum of the frequency difference of the electromotive forces and the rate of change of said frequency difference, and means connected to be energized by said modulated current.

13. In combination, two alternating-current circuits, means connected to be energized from said circuits for producing an effect dependent on the difference between the frequencies of the electromotive forces of the circuits, means controlled by said producing means for effecting the flow of a modulated current, the frequency of the impulses of which differs from the frequency difference of the electromotive forces of said circuits, and means jointly responsive to the frequency of said modulated current and the frequency difference of the electromotive forces of the circuits.

14. In combination, two alternating-current circuits, means operative when a predetermined relation exists between the electromotive forces of said circuits including means connected to be energized from said circuits for producing an effect dependent on the difference between the frequencies of the electromotive forces of the circuits, means controlled by said producing means for effecting the flow of a modulated current, the frequency of the impulses of which is a multiple of the frequency difference of the electromotive forces of said circuit, frequency responsive means connected to be energized by said modulated current, means connected to be energized from said circuits operative in accordance with the difference between the frequencies of the electromotive forces of the circuit, and means controlled jointly by said frequency responsive means and said frequency difference operative means.

15. In combination, two alternating-current circuits, means operative when a predetermined relation exists between the electromotive forces of said circuits, including means connected to be energized from said circuits for producing an effect dependent on a fixed frequency and the difference between the frequencies of said electromotive forces, means controlled by said producing means for effecting the flow of a modulated current, the frequency of the impulses of which is dependent on said frequency difference, and means jointly responsive to the frequency of said modulated current, the frequency difference of the electromotive forces of the circuits, and the rate of change of said frequency difference.

16. In combination, two alternating-current circuits, means operative when a predetermined relation exsists between the electromotive forces of said circuits, including means connected to be energized from said circuits for producing an effect depedendent on the difference between the frequencies of said electromotive forces, means controlled by said producing means for effecting the flow of a modulated current, the frequency of the impulses of which is dependent on said frequency difference, and means jointly responsive to the frequency of said modulated current, the frequency difference of the electromotive forces of the circuits, and the rate of change of said frequency difference.

MAURICE WILFART.